July 8, 1958 W. E. FLEMING 2,842,397
TILTING DUMP TRUCK
Filed March 16, 1953 2 Sheets-Sheet 1
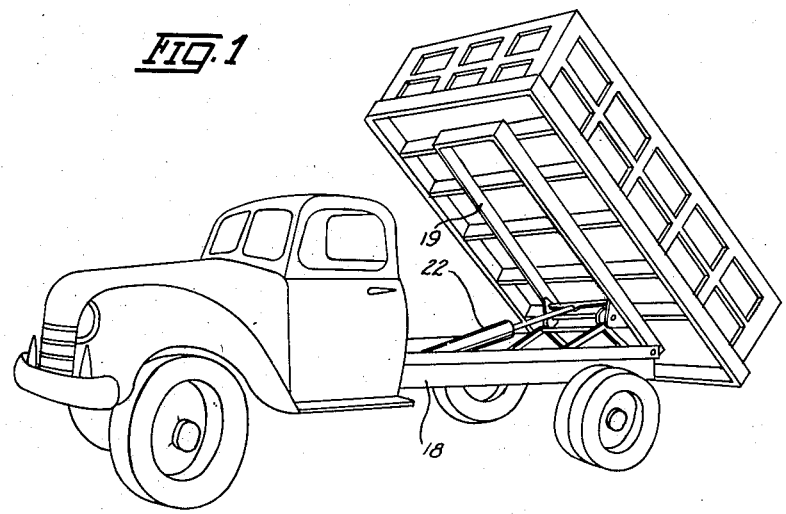
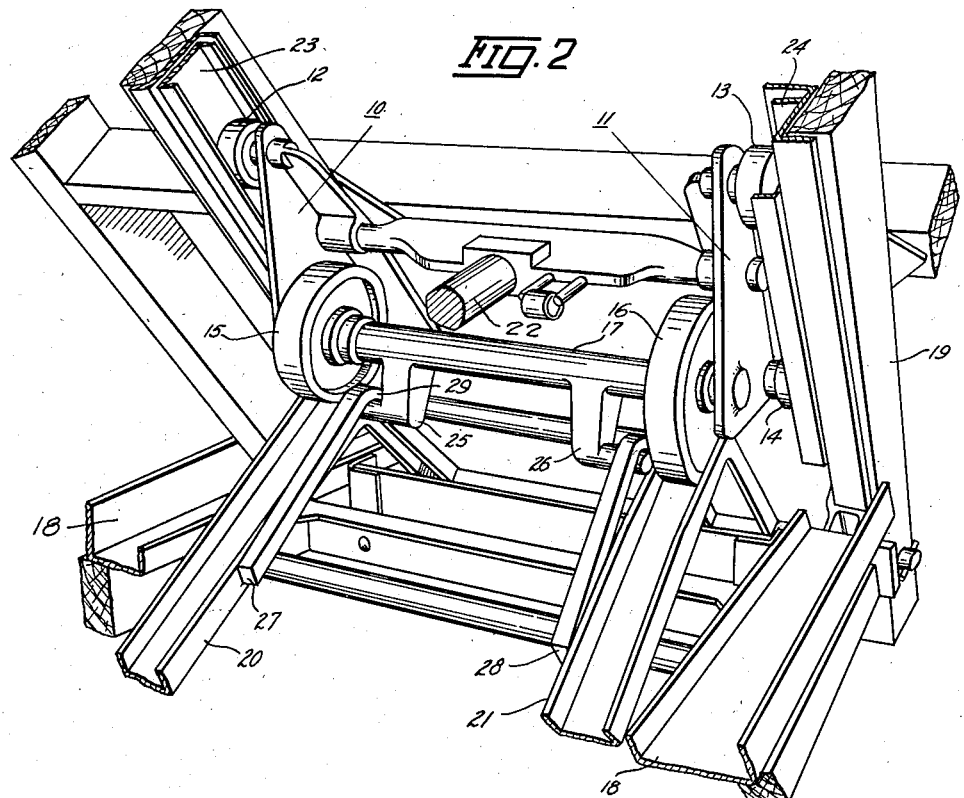
INVENTOR.
WILLIAM E. FLEMING
BY
*Flournoy Corey*
ATTORNEY.

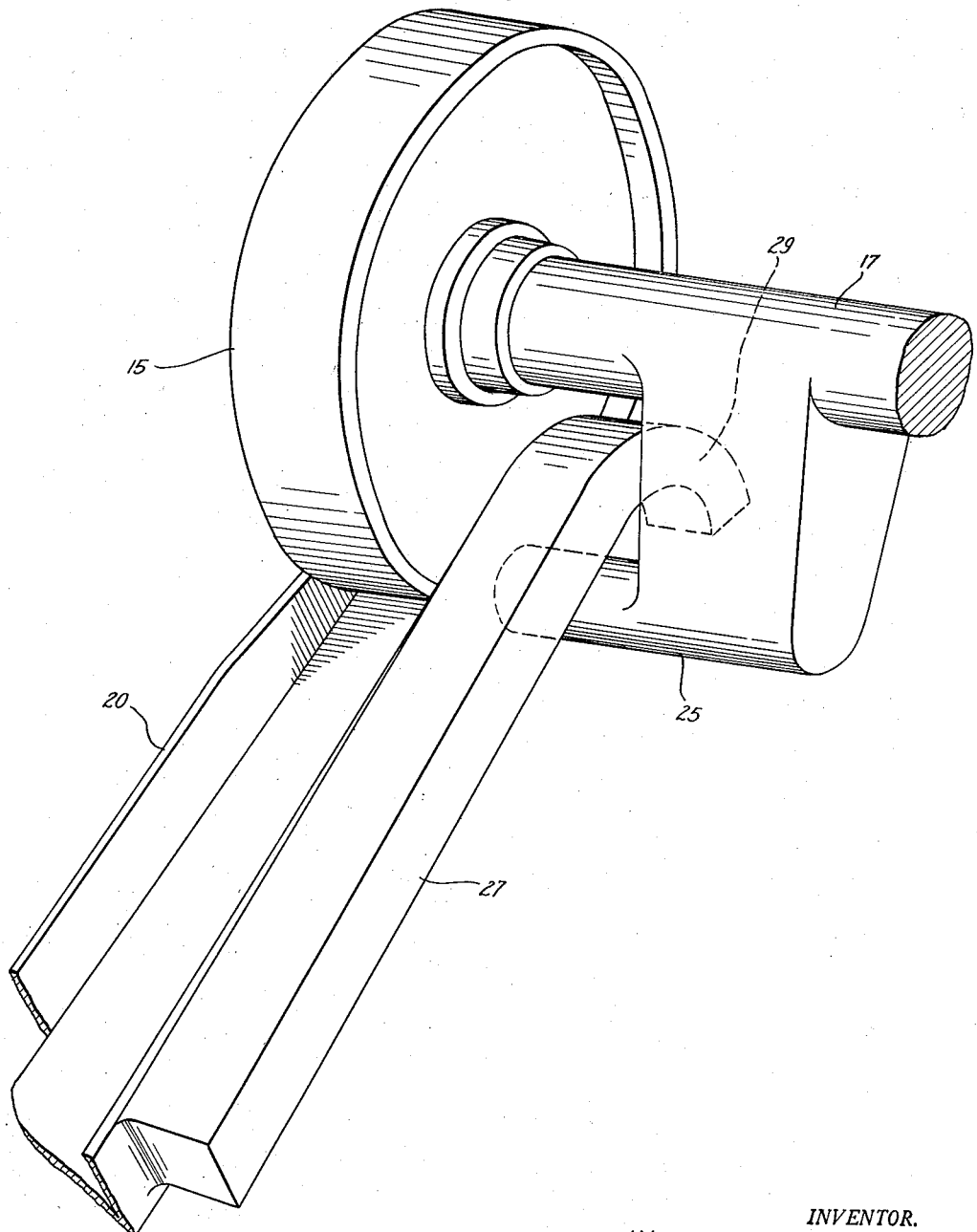

United States Patent Office 2,842,397
Patented July 8, 1958

2,842,397
TILTING DUMP TRUCK

William E. Fleming, Hastings, Nebr., assignor, by mesne assignments, to Wyatt Manufacturing Company, a corporation of Kansas Application March 16, 1953, Serial No. 342,408

1 Claim. (Cl. 298—22)

This invention relates to a hydraulically actuated lift mechanism for an automotive dump truck and is more particularly concerned with holding means to prevent the dump box from tipping over when it is in an elevated position.

The principal object of this invention is the provision of a holding device which would permit the use of a freely movable dolly as a wedge to elevate a dump box. More specifically, it is an object of this invention to provide guides which hold the dolly in a fixed relation with both upper and lower tracks along which the dolly runs regardless of the direction from which force is applied. It will be apparent that as the dump box is raised, the load will move to the rear of the box which could flip in a dangerous uncontrollable movement if some precautions were not taken.

Another object of my invention is the provision of guide means which are an integral part of the track members and will not bind the dolly, yet will prevent the dolly from being raised off of its tracks and limit its outward movement.

These and other objects and advantages of my invention will be apparent to those skilled in the art after a consideration of the accompanying drawings and following specifications, wherein is disclosed a single exemplary embodiment of the invention, with the understanding, however, that such changes may be made therein as fall within the scope of the appended claim, without departing from the spirit of the invention.

In said drawings:

Figure 1 is a view in perspective of an automotive truck having a dump box mounted thereon and shown in an elevated position to disclose the dolly mechanism whereby said dump box is raised and lowered.

Figure 2 is an enlarged view of the dolly mechanism to show the relationship and nature of the guide means employed to hold the dolly in contact with the upper and lower tracks, and Figure 3 is a still further enlargement of Figure 2 to show in detail the nature of the guide bar which serves as a holding means and to disclose the hook members.

Referring now to the drawings, and more particularly to Figure 2; it will be noted that the dolly mechanism comprises two opposed triangular plates 10 and 11, the upper portions of which carry rollers 12, 13 and 14, and a fourth roller (not shown). A shaft 17 is rigidly attached to the lower corner portions of triangular plates 10 and 11. Rotatably mounted on shaft 17 adjacent the respective lower corners of plates 10 and 11 are two larger rollers 15 and 16. All of the aforementioned rollers are so mounted as to be freely turning units.

The dolly is adapted to move backward or forward between a pair of parallel chassis tracks 20, 21 of chassis frame 18 and a pair of parallel dump tracks 23 and 24 of dump frame 19, chassis track 20 being below dump track 23 and chassis track 21 being below dump track 24. Chasis tracks 20 and 21 are attached by means only partly shown to chassis frame 18 which in turn is secured to the chassis of the truck. Tracks 20 and 21 extend longitudinally, upwardly and rearwardly with respect to chassis frame 18 and have upper rear portions adjacent the rear end of the chassis frame. An hydraulic jack 22 is provided for moving the dolly. It comprises a cylinder pivotally mounted at its front end on chassis frame 18 by means not shown and a piston rod extending rearwardly which is pivotally attached at its rear end to the plates 10 and 11 of the dolly. It will be noted that the upper rollers move in channel-like dump track members 23 and 24. These channels are preferably slightly wider than the diameter of the rollers to prevent binding. These channel members serve to keep the dolly in firm contact with the upper frame at all times.

I will now describe the means whereby the dolly is kept in firm contact with inclined chassis tracks 20 and 21. Cross shaft 17 has been provided with two L-shaped lugs 25 and 26. To engage these two lugs, two bar shaped guides 27 and 28 have been attached to the inclined track members. Referring to Figure 3, it will be noted that these guide members are of substantial length and rigidly attached at their lower or forward ends to the respective chassis tracks, e. g. guide bar 27 is rigidly attached at its forward end to chassis track 20, while their outer or rear ends are formed into downturned hooks such as 29 on guide bar 20, these hooks being provided to stop the outward movement of the lugs 25 and 26.

From the foregoing description, it will be apparent that I have provided a mechanism wherein a dolly can be used as a freely movable wedge, and yet held in constant contact with both upper and lower tracks at all times. At the same time, the upper limits of movement of the dump tracks and of the dump box to which the dump tracks are fixed are also set by the same means.

Although I have described a specific embodiment of my invention, it will also be understood that modifications of the herein described holding device may be made without departing from the spirit and scope of the present invention as set forth in the appended claim.

The hydraulic lift device disclosed herein, exclusive of the means for holding the dolly in contact with the chassis track and preventing the dump box from tipping over, is disclosed and claimed in the copending application by Fayette E. Marsh et al., Ser. No. 342,332, filed March 16, 1953.

I claim as my invention:

In an hydraulic lift device for a dump truck, said truck comprising a chassis frame and a dump frame pivotally mounted adjacent the rear of said chassis frame for rotation about an axis transverse to said chassis frame, said chassis frame having a chassis track extending longitudinally, upwardly, and rearwardly with respect thereto, with its upper rear portion adjacent the rear end of said chassis frame, said dump frame having a longitudinally disposed dump track above said chassis track, said dump track being disposed approximately parallel to said dump frame and comprising a channel with parallel upper and lower flanges, an hydraulic cylinder pivotally attached at one end to said chassis frame at a position spaced forwardly of the pivotal mounting of the dump frame, a piston rod extending from the other end of said cylinder, a dolly pivotally attached to the end of said piston rod, said dolly comprising a triangular vertically disposed plate, a pair of upper rollers between the upper and lower flanges of said dump track bearing against said dump track, said rollers being longitudinally spaced and rotatably mounted adjacent two respective corners of said triangular plate, a lower roller bearing against said chassis track, said lower roller being rotatably mounted adjacent the remaining corner of said triangular plate, said piston rod being pivotally attached to said triangular plate at a point intermediate said upper rollers, and means for retaining said dolly in close proximity to said chassis track, said means comprising a guide bar attached at its forward end to said chassis track, said guide bar extending longitudinally, upwardly and rearwardly along said chassis track and having a downwardly curved hook portion proximate the upper rear portion of said chassis track, said triangular plate having a shaft extending laterally therefrom adjacent said remaining corner thereof, said lower roller being rotatably mounted on said shaft, and a lug depending from said shaft, said lug having a hook portion extending under said guide bar.

References Cited in the file of this patent

UNITED STATES PATENTS

| | | |
|---|---|---|
| 1,581,713 | Adams | Apr. 20, 1926 |
| 1,715,491 | Barrett | June 4, 1929 |
| 1,889,520 | Anthony | Nov. 29, 1955 |

FOREIGN PATENTS

| | | |
|---|---|---|
| 365,494 | Great Britain | Jan. 21, 1932 |
| 617,989 | Great Britain | Feb. 15, 1949 |